United States Patent Office 3,467,667
Patented Sept. 16, 1969

3,467,667
TETRAHYDROPYRANYL TYROSINE N-CARBOXY
(AND THIOCARBOXY)ANHYDRIDES
Harvey Schwam, Flushing, N.Y., assignor to Merck & Co.,
Inc., Rahway, N.J., a corporation of New Jersey
No Drawing. Filed Apr. 22, 1966, Ser. No. 544,358
Int. Cl. C07d 7/04; C07c 101/02, 103/52
U.S. Cl. 260—307
7 Claims

ABSTRACT OF THE DISCLOSURE

The invention disclosed herein is concerned with novel derivatives of hydroxylated aromatic amino acids. More particularly it is concerned with tetrahydropyranyl derivatives of N-carboxy anhydrides and N-thiocarboxy anhydrides of hydroxylated aromatic α-amino acids such as tyrosine, which are conveniently prepared by reacting corresponding N-carboxy or N-thiocarboxy anhydride with dihydropyran. These compounds are useful in the synthesis of heteropeptides and other proteinaceous materials containing such amino acids.

---

The controlled, stepwise synthesis of heteropeptides is a problem which has long challenged the art. Such products are useful as stepping stones in the synthesis of proteins. Some of them are therapeutically active. They are also useful in the study and analysis of proteins, especially in studies designed to gain insight into the mode of action of enzymes, hormones and other proteins with important functions in the body.

Controlled stepwise synthesis of heteropeptides and proteins may be effected by reacting an amino acid such as glycine or a peptide, for example a tetrapeptide, in an aqueous medium under controlled conditions of concentration, temperature, time and hydrogen ion concentration with an N-carboxy amino acid anhydride to form an N-carboxy peptide which is then decarboxylated, suitably at a low pH to produce the desired product. The procedure may be carried out without isolation of intermediates so that heteropeptides of extremely high molecular weight containing a number of different amino acids can be prepared in the same reaction medium. The process is similarly applicable to N-thiocarboxy amino acid anhydrides. Both processes are illustrated as applied to the products of this invention in the examples.

Generally speaking the process comprises reacting an N-carboxy or N-thiocarboxy amino acid anhydride with the amino group of a second amino acid or peptide under conditions such that the only amino group present in appreciable concentration in reactive form during the course of the reaction is the amino group which is to participate in the reaction. The coupling reaction normally takes place under alkaline conditions, usually at a pH of from about 8.5 to 11, although significantly higher hydrogen ion concentrations can be used in many coupling reactions. The intermediate carbamate or thiocarbamate is then decarboxylated or dethiocarboxylated, usually by lowering the pH to from about 3 to 5.

Functional groups other than the α-amino group on a reactant can interfere with the course of the above-described reaction and significantly decrease the yield by the production of undesirable by-products. Thus, for example, the reaction between an amino acid and a N-carboxy or N-thiocarboxy amino acid anhydride can be especially troublesome if the anhydride has another functional substituent such as a hydroxyl or an amino group. The anhydride instead of reacting with the amino acid to produce the desired peptide may react with itself to produce unwanted by-products. Hydroxyl groups such as the hydroxyl group on the aromatic ring or tyrosine, 3,5-dibromotyrosine and 3,5-diidotyrosine are especially troublesome in this respect.

Blocking groups such as the acetyl radical can be used to prevent this reaction. Thus, for example, the O-acetyl N-carboxy anhydride of tyrosine or the corresponding thio compound can react with phenylalanine under the above-described conditions to produce O-acetyl-tyrosyl phenylalanine. It is, however, necessary to remove the acetyl group from this compound to produce the pure dipeptide. This introduces another step in the reaction sequence, and results in undesirable diminution in the yield of unblocked dipeptide.

It has now been discovered that it is possible to avoid this extra step by replacing active hydrogen atoms with a substituent which is removed during the course of the coupling reaction, and, in accordance with this invention, hydroxyl groups on N-carboxy or N-thiocarboxy aromatic amino acid anhydrides, that is to say hydroxyl groups which are phenolic in character rather than alcoholic, are blocked with a tetrahydropyranyl group. It has been found that this group is spontaneously and concurrently released during the decarboxylation of dethiocarboxylation reaction. The novel tetrahydropyranyl N-carboxy amino acid anhydrides and N-thiocarboxy amino anhydrides of such aromatic amino acids and are included within the scope of this invention.

It has been discovered that, although free phenolic hydroxyl groups substantially interfere with the original coupling reaction in which tyrosine or the like is joined to an amino acid or peptide in a growing polypeptide chain, they do not appreciably interfere with subsequent coupling reactions in which additional amino acids are added to the chain.

The novel compounds of this invention are prepared by reaction between dihydropyran and the appropriate N-carboxy or N-thiocarboxy amino acid anhydride in the presence of an acid catalyst.

In a typical reaction carried out in accordance with this invention the N-carboxy or N-thiocarboxy anhydride of tyrosine is taken up in dihydropyran containing a catalytic quantity of acid. The dihydropyran functions both as reactant and reaction medium. The starting material is insoluble in the reaction medium, but the product is insoluble. Accordingly the mixture is simply stirred, preferably at room temperature, e.g., 25° C. to 35° C. until substantially all of the starting material has dissolved. This product is then isolated by any convenient procedure.

Solvents, especially cyclic ether solvents such as dioxane or tetrahydrofuran can be employed if desired. Solvents are generally employed in those instances in which an equimolar quantity or only a slight excess, for example 10% molar excess, of dihydropyran is utilized. Since excess dihydropyran helps to insure best yields, it is preferred to avoid the use of solvents and to carry out the reaction using dihydropyran both as reactant and reaction medium.

The reaction temperature preferably should not be appreciably above 40° C. because of the tendency of dihydropyran to polymerize at higher temperatures. The reaction period may vary within wide limits, e.g. 10 to 60 hours. It is best not to use temperatures appreciably below 20° C. At room temperature, which is preferred, the reaction is generally completed within 30 to 50 hours.

The acid catalyst is preferably an organic acid catalyst such as para-toluenesulfonic acid, sulfonic acid or the corresponding sulfonyl halides, especially sulfonyl chlorides. Inorganic acids, especially mineral acids such as sulfuric or hydrochloric acid may be utilized. The selected catalyst is used in catalytic quantities, for example from about 40 to about 100 milligrams per gram of anhydride or thioanhydride. The preferred quantity with a view to economical attainment of optimum yields is from 40 to 60 milligrams per gram of amino acid derivative.

At the end of the reaction period the product may be isolated chromatographically if desired. However, the preferred procedure is to dilute the reaction mixture by the addition of a precipitating liquid such as a hydrocarbon or mixture of hydrocarbons containing up to about eight carbon atoms. Petroleum ether is suitable, although an aromatic hydrocarbon such as benzene may also be used.

While especially useful for the preparation of polypeptides containing tyrosine, the reaction is not so limited. It may with equal facility be used to prepare analogous derivatives of other hydroxylated aromatic amino acids such as 3,5-dibromotyrosine and 3,5-diiodotyrosine.

The products prepared can be used in the preparation of a wide variety of heteropeptides in accordance with the procedures illustrated in the examples. If desired, they can also be used in the preparation of high molecular weight homopolymers such as polytyrosine by polymerization in an organic solvent in the presence of a base. Such polymeric compounds are widely employed as model compounds in the study of the physical properties of protein like structures.

Although most of the tetrahydropyranyl segment is removed during the decarboxylation or dethiocarboxylation step which, as illustrated, takes place under acidic conditions, it is not essential that the reaction be completed during the first coupling reaction. It may, with equal facility, be completed during subsequent coupling reactions. In fact, under some conditions it may be preferable to do so. For example in the preparation of a decapeptide in which tyrosine is the second segment in the chain, considerable reaction time may be saved if decarboxylation or dethiocarboxylation is carried out as rapidly as possible. During this period most of the tetrahydropyranyl moiety will be removed, but that quantity which is not removed at this stage will come off in later coupling reactions.

The following examples are given by way of illustration only and should not be considered limitations of this invention, many apparent variations of which are possible without departing from the spirit or scope thereof. The amino acids used in the examples are in the L-configuration. The process is equally applicable to D-acids and to racemic mixtures.

EXAMPLE 1

Tetrahydropyranyl tyrosine N-carboxy anhydride

A total of one gram of N-carboxy tyrosine anhydride is taken up in 20 ml. of dihydropyran containing 60 mg. of p-toluenesulfonyl chloride, and the mixture is stirred at about 25° C. for 48 hours. At the end of this period most of the anhydride is dissolved indicating that the reaction is substantially complete. The reaction mixture is diluted by the addition of 30 ml. of petroleum ether and the desired product precipitates.

EXAMPLE 2

Tetrahydropyranyl tyrosine N-carboxy anhydride

A total of 1 gram of N-carboxy tyrosine anhydride and a molar equivalent of dihydropyran is taken up in 20 ml. of dioxane containing 40 mg. of p-toluene sulfonic acid, and the mixture stirred at 35° C. for 10 hours. At the end of this period the solution is concentrated to one-half the volume at reduced pressure, brought back to the original volume with ethyl acetate, and 0.25 grams of silica gel added. The mixture is then filtered, concentrated to one-half the volume, and the desired product precipitated by the addition of petroleum ether.

EXAMPLE 3

Tetrahydropyranyl tyrosine N-carboxy anhydride

A total of 1 gram of N-carboxy tyrosine anhydride and a molar equivalent of dihydropyran is taken up in 20 ml. of tetrahydrofuran containing 60 mg. of p-toluenesulfonyl chloride, and the mixture stirred at 20° C. for 60 hours. At the end of this period the solution is concentrated to one-half the volume at reduced pressure, brought back to the original volume with ethyl acetate, and 0.25 gram of silica gel added. The mixture is then filtered, concentrated to one-half the volumn, and the desired product precipitated by the addition of petroleum ether.

The following compounds are similarly prepared by replacing the tyrosine derivative with an equivalent quantity of the appropriate starting compound.

Tetrahydropyranyl 3,5-dibromotyrosine N-carboxy anhydride

Tetrahydropyranyl 3,5-diiodotyrosine N-carboxy anhydride.

EXAMPLE 4

Tetrahydropyranyl tyrosine N-thiocarboxy anhydride

A total of 145 g. of tyrosine is taken up in 75 ml. of ethanol containing 18 ml. of water and 68 ml. of 11.7 N potassium hydroxide. To the mixture there is added under nitrogen with stirring 97.5 g. of methyl ethyl xanthate while maintaining the temperature at about 25° C.–30° C. with the aid of a cooling bath. Reaction is continued at this temperature for two hours and then heated to 45° C. and held for an additional 0.5 hour with continued stirring. Most of the alcohol is removed at low pressure and 180 ml. of water added. The mixture is then extracted twice with 100 ml. portions of ether to remove unreacted xanthate. The alkaline aqueous layer is overlayed with 100 ml. of ethyl acetate and 73 ml. of 12 N hydrochloric acid followed by 70 ml. of water is added. The mixture is shaken and the organic layer separated. The aqueous layer is again extracted with 100 ml. of ethyl acetate and the combined organic layers washed twice with 50 ml. portions of saturated sodium chloride solution. The organic layer is separated, dried over sodium sulfate and concentrated at reduced pressure to precipitate the desired methyl thionourethane tyrosine.

A total of 8 g. of methyl thionourethane tyrosine is taken up in 40 ml. of tetrahydrofuran and 6.1 ml. of phosphorus tribromide is added with stirring while maintaining the temperature at 0° C. to 5° C. The reaction mixture is quenched in 200 ml. of 10% aqueous sodium bicarbonate and extracted three times with 100 ml. portions of ethyl acetate. The combined organic layers are washed twice with 50 ml. portions of concentrated sodium chloride solution and dried over sodium sulfate. The desired product N-thiocarboxy tyrosine anhydride is obtained by removing the solvent under reduced pressure.

A total of 5.8 g. of the above-prepared product is converted to the desired compound in dihydropyran in accordance with the procedure of Example 1.

The tetrahydropyranyl N-thiocarboxy anhydrides of 3,5-dibromotyrosine and 3,5-diiodotyrosine are similarly prepared by replacing the tyrosine with an equivalent amount of the appropriate amino acid.

The following preparations illustrate the use of the compounds of this invention in the preparation of peptides.

Preparation 1.—Tyrosyl-prolyl-phenylalanyl-arginine

A total of 15.75 g. of arginine hydrochloride is dissolved in 2.62 liters of sodium tetraborate buffer solution at pH 10. The pH is adjusted to 3 with concentrated sulfuric acid and nitrogen bubbled in for 10 minutes. The pH is raised to 10.2 with 50% aqueous sodium hydroxide and the solution cooled to 0° C. To this mixture there is added 400 g. of ice followed by 82.5 millimoles of phenylalanine N-carboxy anhydride dissolved in 200 ml. of acetone. The mixture is stirred vigorously at this temperature for one minute and acidified with concentrated sulfuric acid to pH 3 while nitrogen is bubbled through for ten minutes. The pH is then adjusted to 9.5 with 50% aqueous sodium hydroxide and 400 g. of ice followed by 112.5 millimoles of proline N-carboxy anhydride in 150 ml. of acetone is added. The solution is stirred vigorously at 0° C. for one minute and decarboxylate, as above. The process is repeated at pH 9.3 with the addition of 15.0 millimoles of tetrahydropyranyl tyrosine N-carboxy anhydride in 150 ml. of acetone. After blending for one minute the pH is adjusted to 7 and the mixture freeze dried. The residue is taken up in methanol and the product absorbed from solution on silica gel. The silica gel with the absorbed product is then added to a silica gel column previously prepared in isopropanol. The column is developed with methanol:water:ammonia, 80:18:2 and the desired tetrapeptide, free of the tetrahydropyranyl group isolated.

The following compounds are similarly prepared utilizing both the tetrahydropyranyl derivative of the appropriate N-carboxy or N-thiocarboxy amino acid anhydride. In each instance the product is isolated free from the tetra hydropyranyl protecting group. With the N-thiocarboxy compounds the coupling pH is 8.8 instead of 9.3 and the reaction period of 40 minutes.

3,5-dibromotyrosyl-prolyl-phenylalanyl-arginine
3,5-diiodotyrosyl-prolyl-phenylalanyl-arginine.

What is claimed is:
1. Tetrahydropyranyl derivatives of N-carboxy and N-thiocarboxy anhydrides of hydroxylated aromatic α-amino acids characterized in that the hydroxylated aromatic α-amino acid is selected from the group consisting of tyrosine; 3,5-diiodotyrosine; and 3,5-dibromotyrosine.

2. A compound of claim 1 in which the tetrahydropyranyl derivative is tetrahydropyranyl tyrosine N-carboxy anhyride.

3. A compound of claim 1 in which the tetrahydropyranyl derivative is tetrahydropyranyl tyrosine N-thiocarboxy anhydride.

4. A compound of claim 1 in which the tetrahydropyranyl derivative is tetrahydropyranyl 3,5-diiodotyrosine N-carboxy anhydride.

5. A compound of claim 1 in which the tetrahydropyranyl derivative is tetrahydropyranyl 3,5-diiodotyrosine N-thiocarboxy anhydride.

6. A compound of claim 1 in which the tetrahydropyranyl derivative is tetrahydropyranyl 3,5-dibromotyrosine N-carboxy anhydride.

7. A compound of claim 1 in which the tetrahydropyranyl derivative is tetrahydropyranyl 3,5-dibromotyrosine N-thiocarboxy anhydride.

References Cited

Parham et al.: J. Am. Chem. Soc. 76, 4962–65 (1954).
McOmie in Advances in Organic Chemistry: Methods & Results, vol. 3, 1963, Interscience Publishers, page 232 relied on.

NICHOLAS S. RIZZO, Primary Examiner

R. V. RUSH, Assistant Examiner

U.S. Cl. X.R.
260—112, 112.5